United States Patent
Cosatto et al.

(10) Patent No.: US 8,379,961 B2
(45) Date of Patent: Feb. 19, 2013

(54) MITOTIC FIGURE DETECTOR AND COUNTER SYSTEM AND METHOD FOR DETECTING AND COUNTING MITOTIC FIGURES

(75) Inventors: Eric Cosatto, Red Bank, NJ (US); Harold Christopher Burger, Princeton, NJ (US); Matthew L. Miller, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 825 days.

(21) Appl. No.: 12/496,785

(22) Filed: Jul. 2, 2009

(65) Prior Publication Data

US 2010/0002920 A1 Jan. 7, 2010

Related U.S. Application Data

(60) Provisional application No. 61/077,966, filed on Jul. 3, 2008.

(51) Int. Cl.
*G06K 9/00* (2006.01)
(52) U.S. Cl. ......... 382/133; 382/134; 382/128; 382/100
(58) Field of Classification Search .................. None
See application file for complete search history.

(56) References Cited

U.S. PATENT DOCUMENTS

| | | | |
|---|---|---|---|
| 7,817,840 B2 * | 10/2010 | Mattheakis et al. | 382/133 |
| 2006/0050947 A1 * | 3/2006 | Petrou et al. | 382/133 |
| 2006/0098858 A1 * | 5/2006 | Guittet | 382/133 |
| 2006/0188140 A1 * | 8/2006 | Gholap et al. | 382/133 |
| 2010/0254589 A1 * | 10/2010 | Gallagher | 382/133 |
| 2011/0311123 A1 * | 12/2011 | Gholap et al. | 382/133 |

* cited by examiner

*Primary Examiner* — Claire X Wang
*Assistant Examiner* — Avinash J. Yentrapati
(74) *Attorney, Agent, or Firm* — Joseph Kolodka; Paul Schwarz

(57) ABSTRACT

A method and system for detecting and counting mitotic figures in an image of a biopsy sample stained with at least one dye, includes color filtering the image in a computer process to identify pixels in the image that have a color which is indicative a mitotic figure; extracting the mitotic pixels in the image that are connected to one another in a computer process, thereby producing blobs of mitotic pixels; shape-filtering and clustering the blobs of mitotic pixels in a computer process to produce mitotic figure candidates; extracting sub-images of mitotic figures by cropping the biopsy sample image at the location of the blobs; extracting two sets of features from the mitotic figure candidates in two separate computer processes; determining which of the mitotic figure candidates are mitotic figures in a computer classification process based on the extracted sets of features; and counting the number of mitotic figures per square unit of biopsy sample tissue.

17 Claims, 7 Drawing Sheets

MITOTIC FIGURE DETECTOR AND COUNTER SYSTEM AND METHOD FOR DETECTING AND COUNTING MITOTIC FIGURES

RELATED APPLICATIONS

This application claims the benefit of U.S. Provisional Application No. 61/077,966, filed Jul. 3, 2008, the entire disclosure of which is incorporated herein by reference.

This application is related to U.S. patent application Ser. No. 12/496,795 filed Jul. 2, 2009, entitled Signet Ring Cell Detector and Related Methods, which claims the benefit of U.S. Provisional Application No. 61/077,969, filed Jul. 3, 2008, and U.S. patent application Ser. No. 12/496,802 filed Jul. 2, 2009 entitled Epithelial Layer Detector And Related Methods, which claims the benefit of U.S. Provisional Application No. 61/077,974, filed Jul. 3, 2008. The entire disclosures of U.S. patent application Ser. No. 12/496,795 filed Jul. 2, 2009, entitled Signet Ring Cell Detector and Related Methods, and U.S. patent application Ser. No. 12/496,802 filed Jul. 2, 2009 entitled Epithelial Layer Detector And Related Methods, are incorporated herein by reference.

FIELD

The present disclosure relates to digital pathology. More particularly, the present disclosure relates to a mitotic figure detector and counter system and method for detecting and counting mitotic figures in a tissue sample.

BACKGROUND OF THE INVENTION

A mitotic figure is a cell nucleus that is undergoing division. Mitosis has four phases: prophase, metaphase, anaphase, and telophase. Mitotic figure counting is one of three criteria (along with pleomorphism and tubularity) that is used for computing the Nottingham-Bloom-Richardson (NBR) grade. The count of mitotic figures per unit area of a human or animal tissue, provides information regarding how cancerous, if at all, the tissue is. The NBR grade is the standard malignancy grading for breast carcinoma. Usually, a trained pathologist counts mitotic figures manually, which is slow and expensive.

Digital pathology involves the use of computers to assist pathologists in grading tissue specimens. For example, a tissue sample for breast carcinoma diagnosis typically takes an expert five minutes or more to grade. Several studies have demonstrated low agreement among pathologists' grading of the same case, questioning the objectivity of their diagnosis. A successful system may assist the pathologist in diagnosis, helping to achieve more reproducible results at lower cost.

The prior art systems automatically detect and count mitotic figures by extracting certain simple features from figures. The figure are then classified as mitotic/non-mitotic by applying user-defined thresholds on the values of these features and then using Fisher's linear discriminant analysis. Unfortunately, the classification results produced by the prior art systems have not been reliable enough to allow the prior art systems to be used as an automatic diagnostic tool.

Accordingly, there remains a need for an apparatus/method for detecting and counting mitotic figures automatically and reliably.

SUMMARY

A method is disclosed herein for detecting and counting mitotic figures in an image of a biopsy sample stained with at least one dye. The method comprises: color filtering the image in a computer process to identify pixels in the image that have a color which is indicative a mitotic figure; extracting the mitotic pixels in the image that are connected to one another in a computer process, thereby producing blobs of mitotic pixels; shape-filtering the blobs of mitotic pixels in a computer process to produce mitotic figure candidates; clustering neighboring ones of the candidate in a computer process to produce refined mitotic figure candidates; extracting sub-images of the refined mitotic figure candidates by cropping the biopsy sample image at the location of the blobs; extracting two sets of features from the sub-images of the refined mitotic figure candidates in two separate computer processes; determining which of the mitotic figure candidates are mitotic figures in a computer classification process based on the extracted sets of features; and counting the number of mitotic figures per square unit of biopsy sample tissue.

Also disclosed herein is a system for automatically detecting and counting mitotic figures in an image of a biopsy sample stained with at least one dye. The system comprises: a preprocessing unit for selecting mitotic figure candidates; two feature extraction units that compute separate sets of features from candidate mitotic figures; a classifying unit for determining which of the mitotic figure candidates are mitotic figures; and a counting unit for counting the number of positively classified mitotic figures per square unit of biopsy sample tissue.

DETAILED DESCRIPTION

A system and method are disclosed herein for automatically locating or detecting mitotic cells (figures) and counting the detected mitotic figures in an image of a biopsy sample of tissue (e.g., human breast tissue, animal tissue, etc.) stained with hematoxylin and eosin. A mitotic figure is a cell nucleous that is undergoing cell division. The number of mitotic figures per unit area of tissue provides information regarding how cancerous, if any, the tissue is. The mitotic figure detecting and counting system/method will always provide the same output given the same input.

Figure 1:
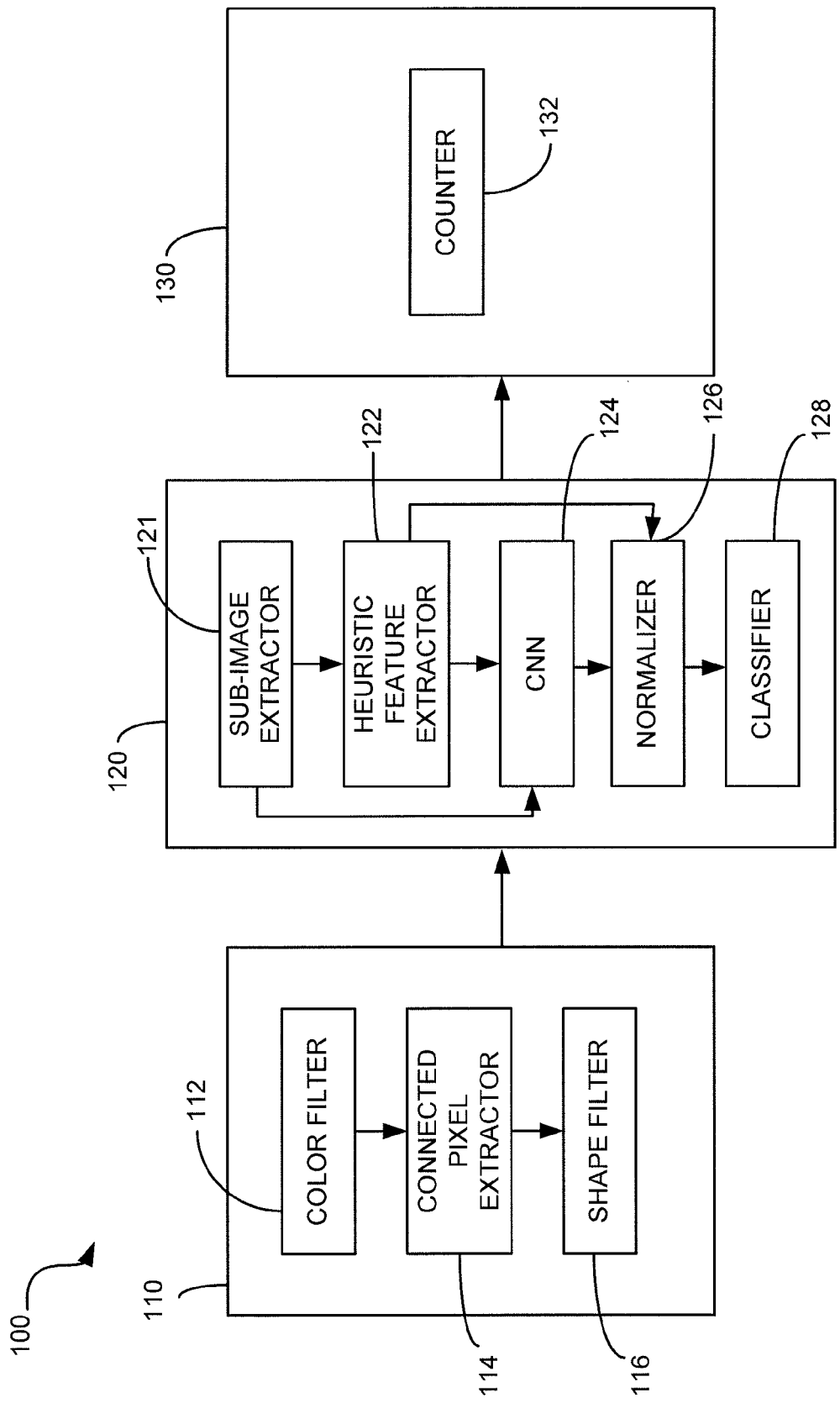
FIG. 1 is block diagram of an illustrative embodiment of the mitotic figure detecting and counting system.

FIG. 1 is block diagram of an illustrative embodiment of the mitotic figure detecting and counting system 100. The system 100 generally comprises a preprocessing unit 110, a classifying unit 120, and a counting unit 130. The preprocessing unit 110 comprises a color filter 112, a connected pixel extractor 114, and a shape filter 116. The classifying unit 120 comprises a sub-image extractor 121, a heuristic feature extractor 122, a convolutional neural network (CNN) 124, a feature vector normalizer 126, and a classifier 128, such as a support vector machine (SVM), a multilayer perceptron (MLP), and a k nearest neighbors classifier (kNN), to name a few examples. The counting unit 130 includes a counter 132 for counting the number of mitotic figures per square unit of tissue, which is indicative of the tumor proliferation rate.

The preprocessing unit 110 identifies candidate mitotic figures by applying a color threshold on the entire image. The classifying unit 120 classifies the candidate mitotic figures using two or more different machine learning methods. The figures that are deemed to be mitotic by the system are those, which have been classified as mitotic by both machine learning methods.

The system 100 achieves sufficiently accurate results, which enables it to be used as a diagnostic tool. The advantages of using the system in 100 place of a human pathologist to count mitotic figures include, without limitation, faster operation and lower cost. In addition, human pathologists are not able to create reproducible results. Since the system returns the same count of mitotic figures for the same input, the results are reproducible. Finally, the system requires few user-defined parameter values.

The use of the CNN 124 in the classification unit 120 avoids having to decide based on which features a nucleus should be classified. The CNN 124 learns these features automatically from labeled data (training set) provided by a trained pathologist. More specifically, as the CNN 124 is trained with labeled examples, the internal weights of the CNN 124 are slowly adjusted by backpropagating the classification error. Once the CNN 124 is trained this way, as a new input is presented, its output will indicate whether it is a mitotic figure or not. It has been shown that removing the last (fully connected layer) of the CNN 124 and using that vector of values with an SVM or like classifier sometimes improves performance. Furthermore, exposing the last layer allows features to be easily added from the heuristic feature extractor 122. This way the CNN 124, instead of providing a classification, outputs a feature vector, which can be easily concatenated with other features and then classified by the classifier 128. Hence the CNN 124 becomes just a feature extractor, but the features it extracts are "learned" from the data examples, while the heuristic features are hand crafted by a designer/user. In some applications, it is better to let the system learn which features of the data are important for classification, in some other applications it makes sense to exploit knowledge about the nature of the data to craft very specific features that the CNN 124 would probably not to be able to learn automatically. In the present disclosure, the strengths from both approaches are used as the combined features are better than taken individually.

The training set provided by a trained pathologist is small, therefore, the pre-processing unit 110 is provided to limit the number of mitotic figure candidates that need to be classified, which avoids many potential false positives. Also, execution time of the system 100 is reduced by a very large factor by avoiding running the CNN 124 on the entire input image.

Both the CNN 124 and the classifier 128 of the classification unit 120 must be trained, which is achieved using a small set of mitotic figures that have been identified by a trained pathologist. More specifically, positive training examples are provided by the trained pathologist and negative examples are provided by the pre-processing unit. Figures returned by the pre-processing unit, which have not been labeled as mitotic by the trained pathologist, represent the negative training examples.

The SVM or other classifier 128 performs classification based on a feature vector. The features that are extracted are inspired by the way a trained pathologist recognizes mitotic figures. The CNN 124 can be regarded as a feature detector and classifier. The CNN 124 learns the features to detect automatically, based on the training data.

Figure 2:
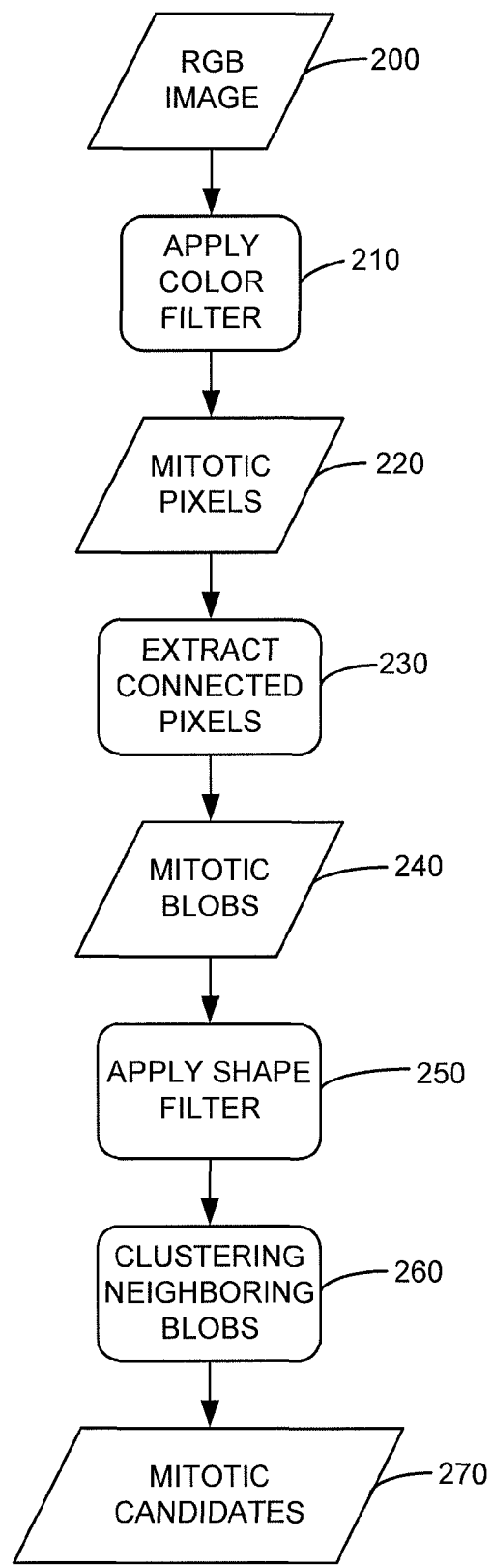
FIG. 2 is a flow chart illustrating an embodiment of a candidate mitotic figure preprocessing method performed by a preprocessing unit of the mitotic figure detecting and counting system.

FIG. 2 is a flow chart illustrating an embodiment of a candidate mitotic figure preprocessing method performed by the preprocessing unit of the mitotic figure detecting and counting system. The preprocessing method commences in box 200 wherein a RGB image of tissue stained with hematoxylin and eosin is provided at an input of the preprocessing unit. The color filter of the preprocessing unit color filters out the RGB pixels of the RGB input image that are of colors which are indicative of non-mitotic figures in box 210, thereby generating pixels in the RGB image that have a color or colors that are indicative of mitotic figures. The color filter outputs a RGB image comprising only the mitotic-colored pixels in box 220.

Figure 3:
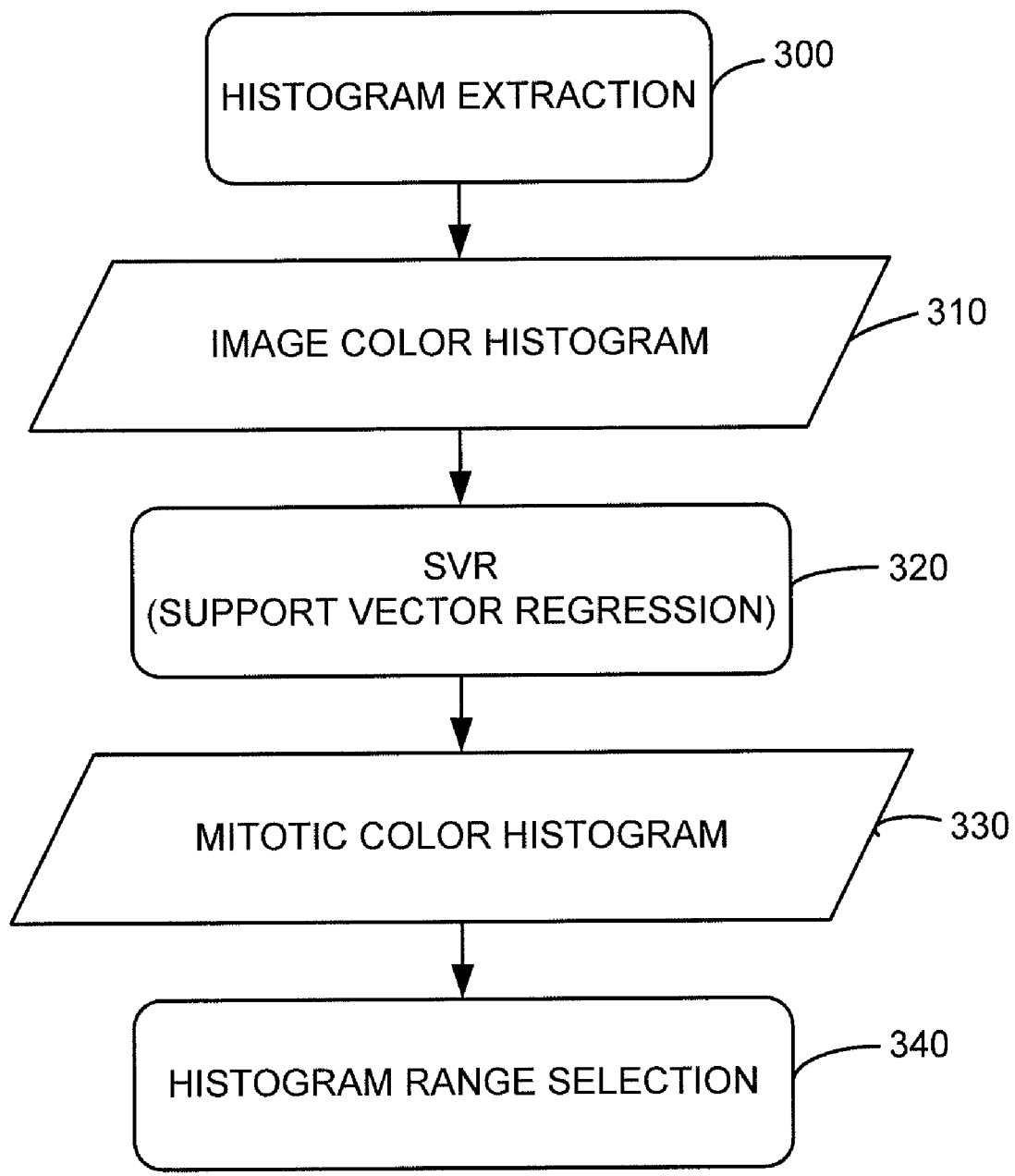
FIG. 3 is a flow chart illustrating an embodiment of a color filtering method performed by a color filter of the preprocessing unit of the mitotic figure detecting and counting system.

FIG. 3 is a flow chart illustrating an embodiment of a color filtering method performed by the color filter of the preprocessing unit. A histogram extractor performs a conventional histogram process on the RGB input image of the tissue in box 300 and outputs an image color histogram of the RGB image in box 310. In the histogram process, each of the pixels in the RGB image contributes a count in red (R), green (G) and blue (B) histogram bins that correspond to the intensity value of each of the R, G, and B color channels, respectively. The number of bins for each channel is a parameter of the system. In one exemplary embodiment, 30 bins are used for each channel. In other embodiments, more less than 30 bins may be used for each channel.

Referring still to FIG. 3, a support vector regression (SVR) is performed on the image color histograms in box 320, to predict mitotic color thresholds from the overall image color histogram. SVR is a regression on input data that is calculated using a SVM method. Hence, for an input vector, an output data vector is obtained. In the present method, the R, G, and B histograms make the input vector for the SVR. The SVR, in turn, outputs R, G, and B color histograms representing the predicted mitotic colors for that image. A histogram range selector then processes the histogram in box 340, to obtain a set of threshold values in each of the R, G, and B channels to determine which pixels are mitotic or not. The histogram range selector defines a parameter that represents the percentage area under the mitotic histogram curve that should be considered as positive (mitotic). The parameter is determined using a receiver operating characteristic (ROC) analysis on a validation set. The pixels in the RGB image that have a color or colors that are indicative of mitotic figures, are produced at the output of the color filter in box 220 (FIG. 2) as a RGB image comprising only the mitotic-colored pixels.

The shape filtering method is performed automatically as an algorithm, but the filtering parameters are designed manually, instead of obtained from trained from data as with the CNN. The parameters typically comprise, without limitation, physical constraints. For example, but not limitation, the size of a mitotic figure cannot be larger than 20 microns.

Referring again to FIG. 2, the connected pixel extractor extracts out mitotic-colored pixels in the RGB image, which are connected to one another in box 230. The connected (touching) mitotic-colored pixels in the RGB image are the pixels in the image that are most likely to be forming a mitotic figure. In box 240, the connected pixel extractor outputs an RGB image of mitotic blobs, which are formed by the connected mitotic pixels. The shape filter filters the RGB image of mitotic blobs to remove mitotic blobs that do not meet certain blob shape and mass (the number of pixels in the blob) parameters in box 250. These parameters are selected so that mitotic blobs that can't possibly represent a mitotic figure are discarded. It is sometimes the case (such as in the telophase phase of the mitosis process) that a mitotic figure may be represented by two or more blobs of connected pixels. To account for such cases, a clustering step is performed in box 260. Neighboring blobs of connected pixels are clustered together to represent a single mitotic candidate. A possible embodiment of such a clustering step is a leader-clustering process based on center-of-mass distance between blobs. In one exemplary implementation of this embodiment, two blobs which are separated by a distance of less than 5 microns, would be clustered together into a single mitotic candidate.

Figure 4:
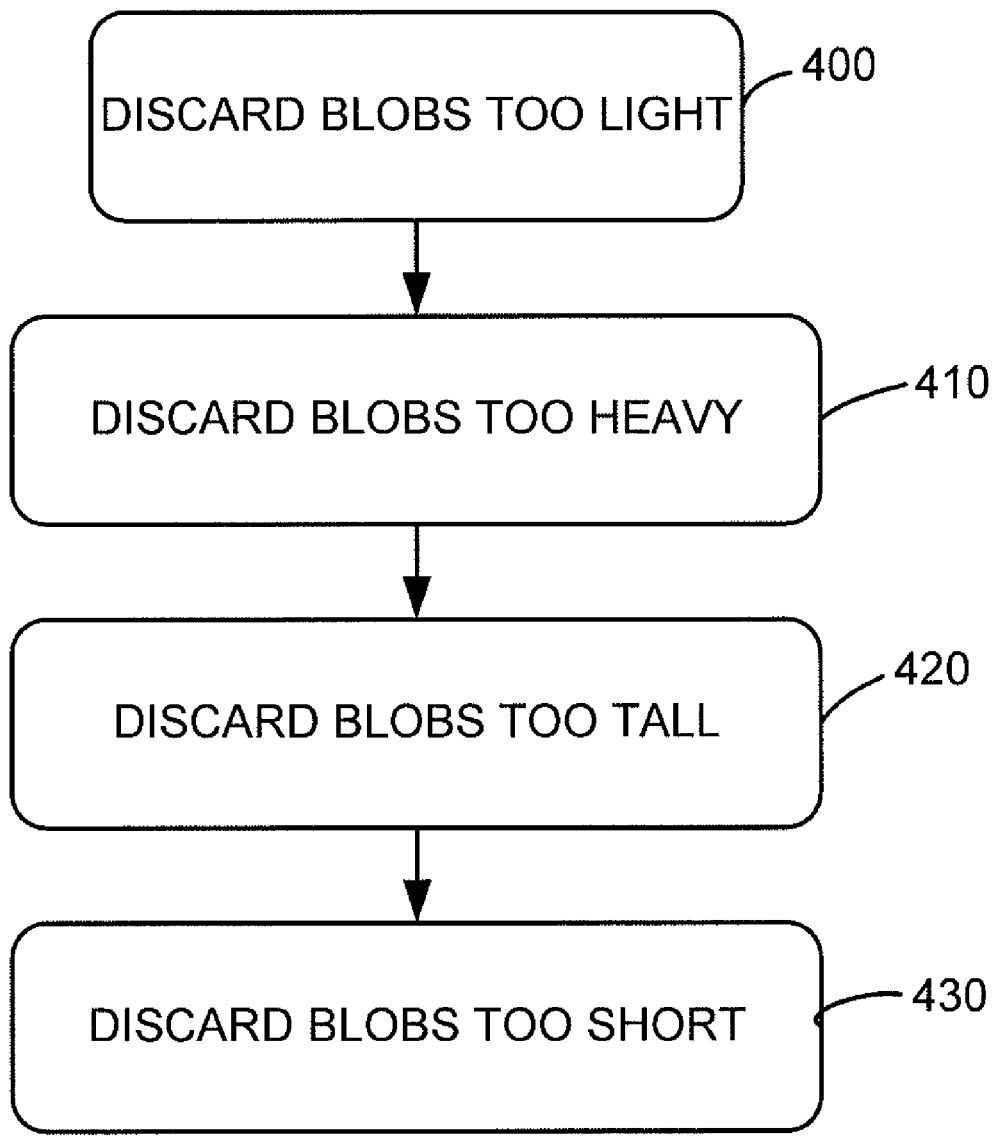
FIG. 4 is a flow chart illustrating an embodiment of a shape filtering method performed by a shape filter of the preprocessing unit of the mitotic figure detecting and counting system.

FIG. 4 is a flow chart illustrating an embodiment of a shape filtering method performed by the shape filter of the preprocessing unit. In box 400, mitotic blobs 240 (FIG. 2) in the RGB image at the input of the shape filter, which are too light (a blob with just a few connected pixels, i.e., a small mass, which is probably just noise) are discarded. Mitotic blobs 240 (FIG. 2) in the RGB image at the input of the shape filter, which are too heavy (a blob with a very large number of connected pixels, i.e., a very large mass, which is unlikely to be a mitotic figure) are discarded in box 410. In box 420, mitotic blobs 240 (FIG. 2) in the RGB image at the input of the shape filter, which are too tall are discarded. Mitotic blobs 240 (FIG. 2) in the RGB image at the input of the shape filter, which are too short are discarded in box 430.

Figure 5:
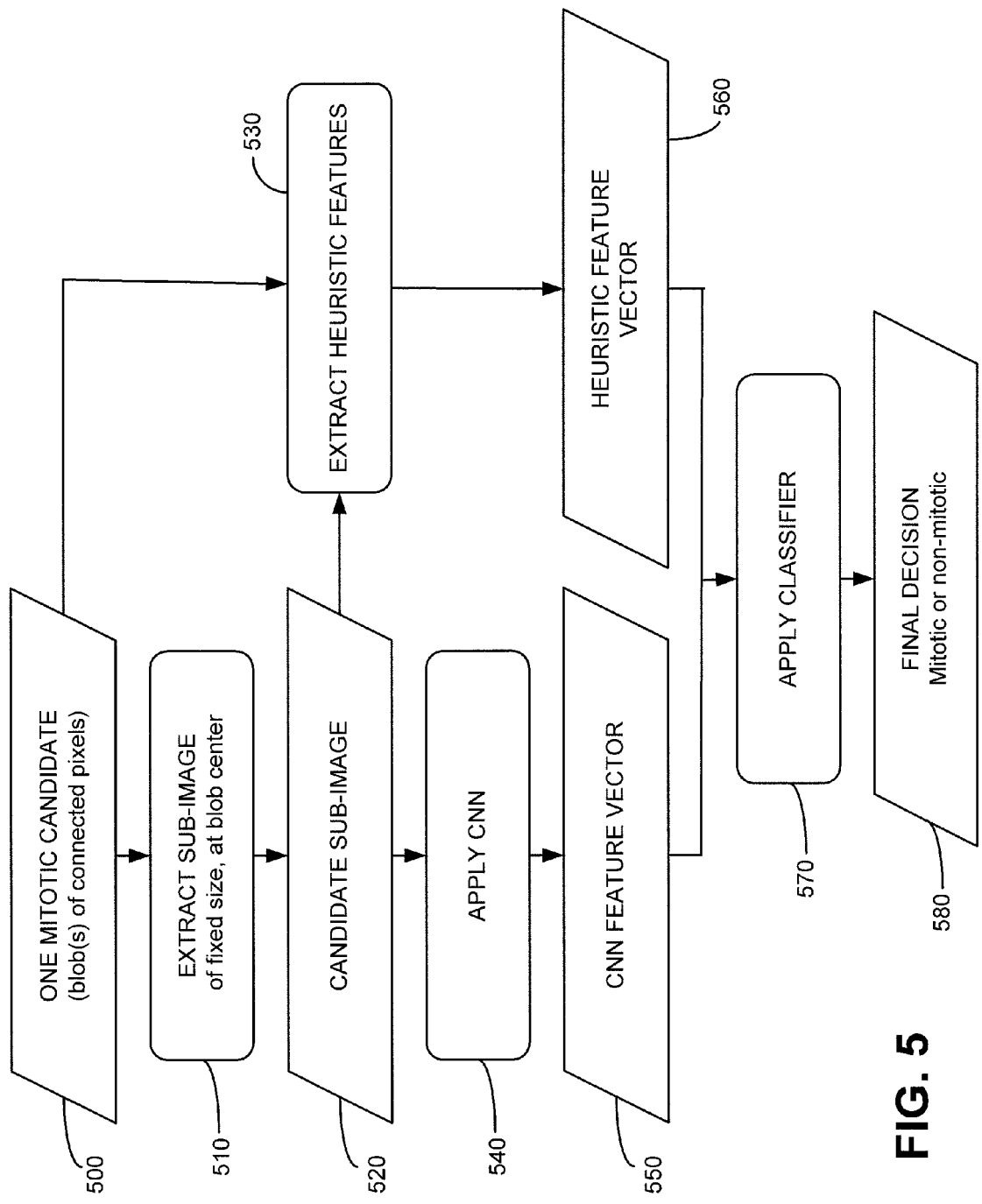
FIG. 5 is a flow chart illustrating an embodiment of a candidate mitotic figure classification method performed by a classifying unit of the mitotic figure detecting and counting system.

FIG. 5 is a flow chart illustrating an embodiment of a candidate mitotic figure classification method performed by the classifying unit of the mitotic figure detecting and counting system. The classification method commences in box 500 wherein one of the mitotic candidates is provided at an input of the sub-image extractor unit (box 510). The sub-image extractor unit extracts a candidate RGB sub-image 520 of a fixed size using location and shape information from the mitotic candidate. In one embodiment of this extraction process, the center of mass of the blob(s) of one mitotic candidate are used to provide the coordinate points of a simple image cropping process. The candidate sub-image 520 is then applied to a convolutional neural network (CNN) in box 540 and a heuristic feature extractor (HFE) in box 530.

Figure 6:
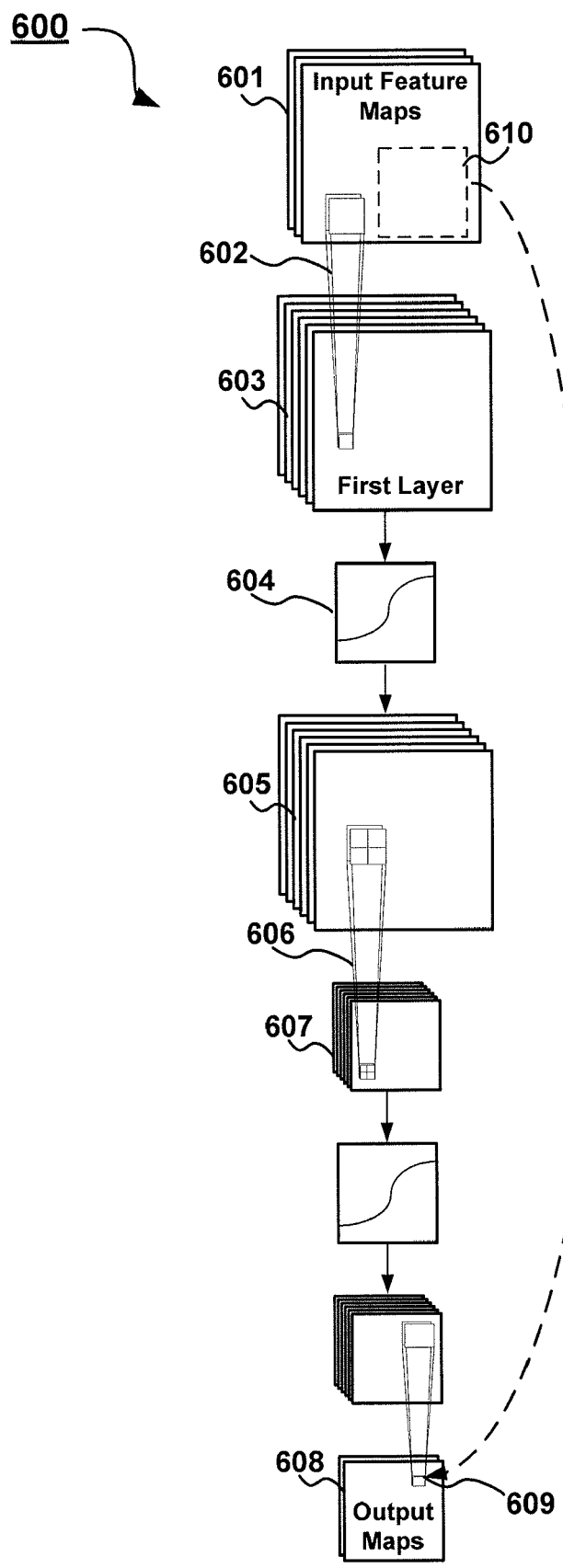
FIG. 6 schematically depicts a conventional convolutional neural network.

CNNs are well known in the art and generally comprise a conventional neural network with its connections arranged in a manner that efficiently implement spatial image convolutions. The CNN in the present disclosure learns features of the mitotic candidate images and outputs CNN features or CNN feature vectors. FIG. 6 schematically depicts a conventional CNN 600. The structure and function of CNN 600 is well known in the art. The CNN convolves a stack of inputs 601 (input layer), referred to as feature maps, with small filters 602 to obtain a new stack of feature maps, referred to as an internal layer or first internal layer 603. Each of the feature maps in this first internal layer 603 is obtained by convolving one or more of the input maps with trained kernels (usually having different weights), and adding together the results. The resulting values are then passed through a non-linear transfer function 604 to obtain second internal layer 605. A third internal layer 607 is obtained by subsampling 606, wherein each value is obtained by averaging together a group of adjacent values from the previous internal layer (e.g., second internal layer 605). The groups do not overlap, so the resulting internal layer is substantially smaller than the previous internal layer. After several internal layers, it is clear that each value 609 in output layer 608 depends on an input window 610 of adjacent values in the input layer 601. Furthermore, these windows overlap with one another.

The CNN is operative as a classifier as its output indicates whether a figure is mitotic or non-mitotic. The CNN is trained as a classifier by presenting labeled positive (mitotic) and negative (non-mitotic) figure examples (input sub-images of, for example, 60×60 pixels) at the input and by back-propagating the error that it produces at the output. To obtain a CNN feature vector at the output instead of a single value, the last layer of the CNN (wherein for example, the last layer was a vector of 20 values fully connected to 1 output) is removed when the training phase is completed. Hence, when a candidate sub-image is presented at the input of the CNN, a feature vector of size 20 (using the previous example) is produced at the output of the CNN. The CNN features are designed to capture features that the user typically would not recognize, or features that may be quite expensive to compute explicitly.

The structure and operation of HFEs are well known in the art. The HFE transforms the input candidate sub-image into a reduced representation of features or feature vectors. The heuristic features are not automatically trained from data, but instead are designed manually by the user based on how well the heuristic features discriminate between mitotic and non-mitotic figures. For example, mitotic figures are convoluted in shape, so it is expected that a measure of the average curvature (curvature histogram) of the contour of the blob of pixels representing the mitotic candidate is a good feature to extract. Other features which may be extracted using the HFE includes, without limitation, average radii (radii histogram), mass, contour length, concavity, cytoplasm colors, mitotic colors, chromosomal bristles, and granularity.

Referring again to FIG. 5, the CNN and heuristic feature vectors are normalized and then, in box 570, a classifier is applied to the normalized CNN and heuristic feature vectors. The classifier processes the normalized CNN and heuristic feature vectors and in box 580, produces at its output a final decision as to whether a figure is mitotic or non-mitotic. The CNN features complement the heuristic features so that the combined features are more powerful in discriminating between mitotic and non-mitotic figures. In one exemplary embodiment, the classifier applied to the normalized CNN and heuristic feature vectors in box 570 may comprise a support vector machine.

The counting unit of the system counts the number of mitotic figures detected in the image of a biopsy sample of by the classification unit. In an alternative embodiment, the result produced by the system 100 may be presented to user or pathologist who would perform the final counting of mitotic figures.

One skilled in the art will recognize that the mitotic figure detector and corresponding methods described herein, may be implemented using any suitably adapted computer system. The computer system may include, without limitation, a mainframe computer system, a workstation, a personal computer system, a personal digital assistant (PDA), or other device or apparatus having at least one processor that executes instructions from a memory medium.

The computer system may include one or more memory mediums on which one or more computer programs or software components may be stored. The one or more software programs which are executable to perform the methods described herein, may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The mitotic figure detector/counter and corresponding mitotic figure detecting and counting methods (mitotic detector/methods) described herein may also be executed in hardware, a combination of software and hardware, or in other suitable executable implementations. The mitotic detector/methods implemented in software may be executed by the processor of the computer system or the processor or processors of the one or more associated computers or computer systems connected to the computer system.

Figure 7:
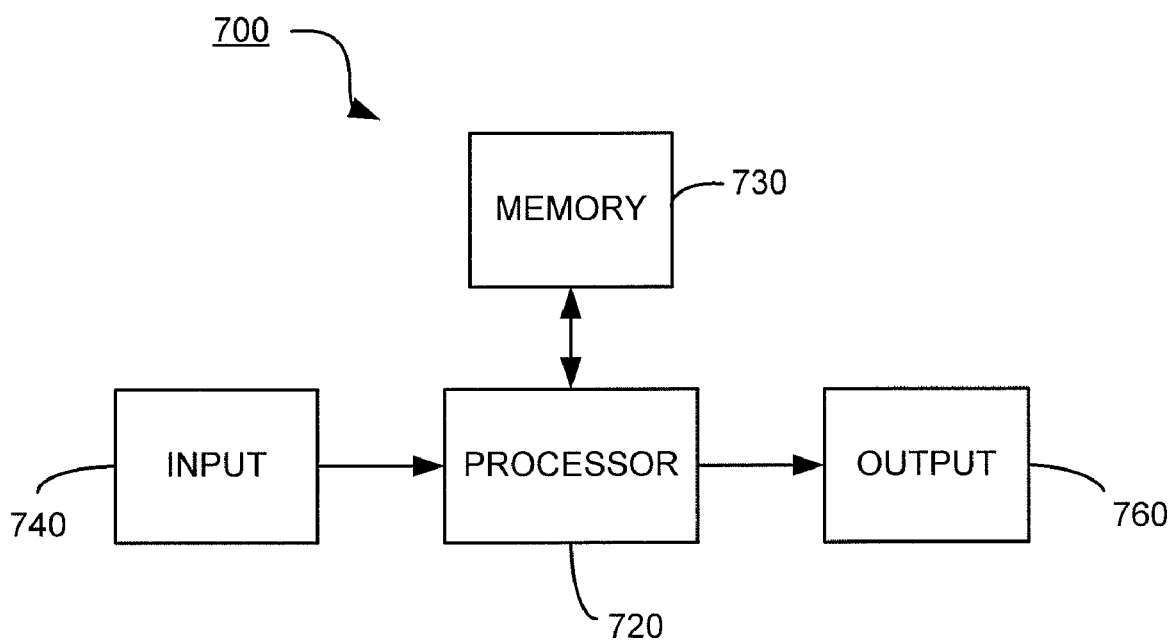
FIG. 7 is a block diagram of an exemplary embodiment of a computer system for implementing the mitotic figure detector/counter and corresponding mitotic figure detecting and counting methods described herein.

FIG. 7 is a block diagram of an exemplary embodiment of a computer system 700 for implementing the mitotic detector/methods described herein. The computer system 700 includes a processor 720, a memory 730 for storing one or more programs which are executable by the processor 720 for implementing the mitotic detector/methods described herein, an input 740 for receiving input data, e.g., unlabeled sub-images for processing, labeled sub-images for training, and training and processing parameters, and an output 760 for outputting data, e.g., one or more predicted labels indicating mitotic and non-mitotic figures.

While exemplary drawings and specific embodiments of the present disclosure have been described and illustrated, it is to be understood that the scope of the invention is not to be limited to the particular embodiments discussed. Thus, the embodiments shall be regarded as illustrative rather than restrictive, and it should be understood that variations may be made in those embodiments by workers skilled in the arts without departing from the scope of the invention as set forth in the claims that follow and their structural and functional equivalents.

What is claimed is:

1. A method for detecting and counting mitotic figures in an image of a biopsy sample stained with at least one dye, the method comprising the steps of:
    color filtering the image in a computer process to identify pixels in the image that have a color which is indicative of a mitotic figure;
    extracting the mitotic pixels in the image that are connected to one another in a computer process, thereby producing blobs of mitotic pixels;
    shape-filtering the blobs of mitotic pixels in a computer process to produce mitotic figure candidates;
    clustering neighboring ones of the candidates in a computer process to produce refined mitotic figure candidates;
    extracting sub-images of the refined mitotic figure candidates in a computer process by cropping the biopsy sample image at the location of the blobs;
    extracting two sets of features from the sub-images of the refined mitotic figure candidates in two separate computer processes;
    determining which of the mitotic figure candidates are mitotic figures in a computer classification process based on the extracted sets of features; and
    counting the number of mitotic figures per square unit of biopsy sample tissue.

2. The method of claim 1, wherein the color filtering step comprises the steps of:
    extracting color histograms from the image to produce image color histograms.

3. The method of claim 2, wherein the color filtering step further comprises the steps of:
    predicting color thresholds from the image color histograms using support vector regression (SVR).

4. The method of claim 3, wherein the color filtering step further comprises the steps of:
    using the color thresholds to select the pixels of the image that have the color which is indicative of a mitotic figure.

5. The method of claim 1, wherein one of the two feature extraction computer processes comprises a convolutional neural network (CNN) computer process.

6. The method of claim 5, wherein the feature extraction step comprises the step of applying the CNN computer process to sub-images of the mitotic figure candidate to obtain CNN features of the mitotic figure candidate.

7. The method of claim 1, wherein one of the two feature extraction computer processes comprises the step of extracting heuristic features from the mitotic figure candidate blobs and sub-images.

8. The method of claim 7, wherein the feature extraction step comprises the step of extracting one or more features from a contour of the mitotic candidate blob, the one or more features including curvature histogram, center of mass radii histogram and spectrum, blob mass, contour length, contour symmetry from center of mass, contour concavity.

9. The method of claim 8, wherein the feature extraction step further comprises the step of extracting one or more heuristic features from the sub-image of the mitotic candidate, the one or more heuristic feature including histogram of cytoplasm colors, histogram of mitotic colors, presence of chromosomal bristles, and measures of the granularity of the image (roughness of texture).

10. The method of claim 1, wherein the computer classification process comprises a support vector machine (SVM) classifier.

11. A system for detecting and counting mitotic figures in an image of a biopsy sample stained with at least one dye, the system comprising:
    a processor executing instructions for:
        color filtering the image to identify pixels in the image that have a color which is indicative of a mitotic figure;
        extracting the mitotic pixels in the image that are connected to one another, thereby producing blobs of mitotic pixels;
        shape-filtering the blobs of mitotic pixels to produce mitotic figure candidates;
        clustering neighboring ones of the candidates to produce refined mitotic figure candidates;
        extracting sub-images of the refined mitotic figure candidates by cropping the biopsy sample image at the location of the blobs;
        extracting two sets of features from the sub-images of the refined mitotic figure candidates;
        determining which of the mitotic figure candidates are mitotic figures based on the extracted sets of features; and
        counting the number of mitotic figures per square unit of biopsy sample tissue.

12. The system of claim 11, wherein one of the feature extraction instructions comprises a convolutional neural network (CNN) for identifying CNN features from the mitotic figure candidate sub-images.

13. The system of claim of 11, wherein one of the feature extraction instructions comprises heuristic feature extractors for extracting heuristic features from the mitotic figure candidates' blob and sub-image.

14. The system of claim 13, wherein the feature extraction instructions further comprises extractors for extracting one or more features from a contour of the mitotic candidate blob, the one or more features including curvature histogram, center of mass radii histogram and spectrum, blob mass, contour length, contour symmetry from center of mass, contour concavity.

15. The system of claim 13, wherein the feature extraction instructions further comprises extractors for extracting one or more heuristic features from the sub-image of the mitotic candidate, the one or more heuristic features including histogram of cytoplasm colors, histogram of mitotic colors, presence of chromosomal bristles, and measure of granularity of the image (roughness of texture).

16. The system of claim 11, wherein the instructions for determining which of the mitotic figure candidates are mitotic figures based on the extracted sets of features is performed comprises a support vector machine (SVM) classifier.

17. The system of claim 11, wherein the instructions for counting the number of mitotic figures per square unit of biopsy sample tissue comprises counting the number of positively classified mitotic figures per square unit of biopsy sample tissue.

* * * * *